UNITED STATES PATENT OFFICE 2,681,892

ANION EXCHANGE MATERIALS AND PREPARATION THEREOF

Theodore Roger Ernest Kressman, Twickenham, England, assignor to The Permutit Company, New York, N. Y., a corporation of Delaware No Drawing. Application July 12, 1949, Serial No. 104,375

Claims priority, application Great Britain July 15, 1948

9 Claims. (Cl. 260—2.1)

This invention relates to the production of anion exchange or acid absorbing resins of the kind that can be used for removing acids from dilute solutions containing them.

In general, an anion exchange resin should have certain properties or qualities in order to be well suited for use in removing acids upon contact with a dilute solution thereof. Such a resin should be as insoluble as possible in water and dilute solutions of acids and alkalies; it should have a large capacity or ability to remove such acids or engage in anion exchange reactions between regenerations, and it should be capable of being regenerated repeatedly without substantial loss of its capacity or ability for anion exchange reactions. It is also highly desirable for such a product to have the ability to remove from solutions not only the customary acids such as hydrochloric, sulfuric, nitric acid and the like, but also extremely weakly acidic materials such as carbon dioxide or silica.

An object of my invention is to provide a simple procedure for making a novel anion exchange resin having the foregoing qualities and properties.

I have found that excellent products may be obtained by producing a condensation product of an aldehyde with a ketone or a nitro-alkane that contains at least two reactive hydrogen atoms, and then reacting this condensation product with a guanidine or a guanyl compound until a gel is formed that can be converted into a water insoluble granular product. In forming the initial condensation product, an aldehyde, such as formaldehyde, is reacted under alkaline conditions with a ketone or nitro-alkane that contains at least two reactive hydrogen atoms and that reacts with formaldehyde to form methylol compounds. Any suitable alkali, such as sodium carbonate, sodium hydroxide, ammonium hydroxide or the like, may be used to promote this reaction.

The condensation product or methylol compounds thus obtained are then reacted with the guanidine or guanyl compound, either in the form of a free base or in the form of a salt, and also in the presence of an alkaline catalyst. In the second stage of the reaction after the guanidine or guanyl compound is added, the mixture is heated, under reflux if necessary, until a gel is formed.

It is possible to obtain a resin with anion exchange properties by mixing together all three ingredients and condensing them in one operation. However, it has been found that products substantially higher in exchange capacity are obtained if the condensation is carried out in two stages as stated above.

Examples of ketones that may be reacted with the aldehyde are acetone, cyclohexanone, methylhexanone and mesityl oxide. Examples of suitable nitro-alkanes are nitro-methane and nitroethane. If a nitro-alkane is employed instead of a ketone, its reaction with the formaldehyde is likely to be very vigorous and difficult to control. For this reason, it is preferable to use a ketone, and for most practical purposes, I prefer to prepare the first condensation product by reacting formaldehyde with acetone.

Examples of suitable guanyl compounds are guanidine, biguanide or guanyl guanidine, and guanyl urea.

It is important that the reaction mixture should remain alkaline throughout the entire procedure since a vesiculated product is obtained under neutral or acid conditions. Also, it is desirable to avoid too large an excess of caustic alkali since this is apt to produce a powdery material, and if too large an excess of alkali is used in the condensation of acetone and formaldehyde this reaction is apt to proceed too far, resulting in the formation of a solid product with which the guanidine or guanyl compound cannot be reacted. In fact, for best results it is desirable to add the alkali in two portions, a small amount when the aldehyde and ketone are condensed and the remainder of the alkali when the guanidine or guanyl compound is added. By way of example, it may be mentioned that the total amount of alkali should be at least 0.1 mol and preferably not more than 1 mol for producing an anion exchange resin with one mol of acetone, 3 mols of formaldehyde and 0.75 mol of guanidine nitrate. With other resin constituents or with other proportions thereof, these limits for the alkali may be varied somewhat.

In regard to proportions of the main constituents, the molar proportion of formaldehyde used is preferably at least about two but not more than about six times that of the ketone or nitro-alkane. Too small an amount of formaldehyde gives a poor gel while too large an amount leads to a vesiculated product.

In regard to the guanidine or its equivalent guanyl compound, there is no critical lower limit, although a substantial amount should be used in order to produce a product having some capacity for anion exchange reactions. If substantially more than 1.5 mols of guanidine per mol of ketone or equivalent is employed, it becomes difficult or even impossible to obtain a gel.

The product after formation of the gel may be aged or dried and granulated in any suitable manner as will be understood by those skilled in the art.

In order to illustrate my invention further, the following examples are given. All proportions are expressed as parts by weight unless specified otherwise.

*Example 1.*—25 parts acetone and 78 parts 40% formalin were mixed and 25 parts of a 20% aqueous caustic soda solution were added to it. The mixture was warmed gently under reflux for a few minutes to complete the reaction which commenced spontaneously upon addition of the alkali. 30 parts of guanidine nitrate were then added and the whole refluxed on a water bath until a gel was formed. This required about 30 minutes in this case. The gel was removed and dried at 105° C. to yield a hard resin which was ground to about 20 to 40 mesh in size.

When placed in a column and regenerated with twice its volume of 5% sodium carbonate the product had a capacity of 20 kgr. per cu. ft. expressed as $CaCO_3$. When regenerated with 2% sodium hydroxide solution the capacity for mineral acid absorption was 22 kgr. per cu. ft. and, in addition, it removed silica to the extent of 1 kgr. per cu. ft.

*Example 2.*—72 parts of acetone and 300 parts 40% formalin were mixed and 10 parts of a 20% aqueous sodium hydroxide solution were added and allowed to stand under reflux until the initial heat of reaction was over, after which it was boiled under reflux for ½ hour. 122 parts of guanidine nitrate were then added and afterwards a further 90 parts of the 20% sodium hydroxide and the mixture heated without reflux until a red gel was formed in about 1 hour. It was dried at 105° C. and the hard resin ground to 20 to 40 mesh.

When set up in the form of a column and regenerated with 5% sodium carbonate solution, the product had a capacity for the absorption of dilute mineral acid of 14 kgr. per cu. ft. expressed as $CaCO_3$.

The exchange material was then regenerated with sodium hydroxide solution and used for the absorption of phenol from a 0.1% aqueous solution. The phenol was removed from a volume of solution 50 times that of the resin before phenol appeared in the effluent.

*Example 3.*—36 parts acetone, 148 parts 40% formalin and 6 parts of 20% sodium hydroxide solution were allowed to stand under reflux until the initial heat of reaction was over, when it was boiled under reflux for ½ hour. The solution was poured out into an open vessel and 75 parts guanyl-urea sulphate and 64 parts 20% sodium hydroxide solution were then added and the whole boiled until it formed an orange red gel. This was dried at 130° C. to give a hard resin which was granulated and set up in the form of a column.

When regenerated with sodium carbonate its capacity for the removal of dilute mineral acid was 10 kgr. per cu. ft. expressed as $CaCO_3$. When regenerated with sodium hydroxide solution and fed with demineralized water which had been air blown to remove carbon dioxide and which contained 15 p. p. m. silica, it removed all but about 0.3 p. p. m. of the silica, and when this residual silica in the effluent began to rise, the resin had taken up the equivalent of 3 kgr. $SiO_2$ per cu. ft. resin.

The anion exchange resins of my invention are preferably used as granules and in the form of a columnar bed through which the liquid to be treated is percolated. When exhausted, or as necessary, the bed of exchange material is regenerated periodically in the usual manner with an alkaline solution.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of preparing an anion exchange resin which comprises forming an alkaline condensation product of an aldehyde and a substance selected from the group consisting of unsubstituted ketones and nitro-alkanes that contain at least two reactive hydrogen atoms and react with formaldehyde to form methylol compounds, and thereafter reacting said product under alkaline conditions with a guanyl compound selected from the group consisting of guanidine, biguanide, guanyl urea and salts thereof to form an insoluble resin.

2. A process of preparing an anion exchange resin which comprises forming an alkaline condensation product of formaldehyde and acetone, and thereafter reacting said product under alkaline conditions with a guanyl compound selected from the group consisting of guanidine, biguanide, guanyl urea and salts thereof to form an insoluble resin.

3. A process of preparing an anion exchange resin which comprises forming a liquid condensation product by reacting under alkaline conditions about 2 to 6 mols of an aldehyde with 1 mol of a substance selected from the group consisting of unsubstituted ketones and nitro-alkanes that have at least two reactive hydrogens and react with formaldehyde to form methylol compounds, and then forming an insoluble resin by heating said product under alkaline conditions with a substantial amount up to about 1.5 mols of a guanyl substance selected from the group consisting of guanidine, biguanide, guanyl urea and salts thereof.

4. A process of preparing an anion exchange resin which comprises forming a liquid condensation product by reacting under alkaline conditions about 2 to 6 mols of formaldehyde with 1 mol of an unsubstituted ketone having at least two reactive hydrogens, and then heating said product under alkaline conditions with a substantial amount up to about 1.5 mols of a guanyl substance selected from the group consisting of guanidine, biguanide, guanyl urea and salts thereof.

5. A process of preparing an anion exchange resin which comprises forming a liquid condensation product by reacting under alkaline conditions about 2 to 6 mols of formaldehyde with 1 mol of acetone, and then forming an insoluble resin by reacting said product under alkaline conditions with a guanidine salt.

6. A process of preparing an anion exchange resin which comprises forming a liquid condensation product by reacting under alkaline conditions about 2 to 6 mols of an aldehyde with 1 mol of a substance selected from the group consisting of unsubstituted ketones and nitro-alkanes that have at least two reactive hydrogens and react with formaldehyde to form methylol compounds, and then forming an insoluble resin by heating said product under alkaline conditions with a substantial amount up to about 1.5 mols of a guanyl substance selected from the group consisting of guanidine, biguanide, guanyl urea and salts thereof, the alkaline material employed as a catalyst being added in at least successive two portions.

7. An anion exchange resin which comprises an insoluble product made by reacting under alkaline conditions an alkaline condensation product of an aldehyde and an unsubstituted ketone having at least two reactive hydrogens with a substance selected from the group consisting of guanidine, biguanide, guanyl urea and salts thereof.

8. An anion exchange resin which comprises an insoluble product made by reacting under alkaline conditions an alkaline condensation product of about 2 to 6 mols of an aldehyde and 1 mol of an unsubstituted ketone having at least two reactive hydrogens with a substantial amount up to about 1.5 mols of a substance selected from the group consisting of guanidine, biguanide, guanyl urea and salts thereof.

9. An anion exchange resin which comprises an insoluble product made by reacting under alkaline conditions an alkaline condensation product of about 2 to 6 mols of formaldehyde and 1 mol of acetone with a substantial amount up to about 1.5 mols of a substance selected from the group consisting of guanidine, biguanide, guanyl urea and salts thereof.

References Cited in the file of this patent

UNITED STATES PATENTS

| Number | Name | Date |
|---|---|---|
| 2,259,169 | Little | Oct. 14, 1941 |
| 2,323,898 | D'Alelio | July 13, 1943 |
| 2,325,376 | D'Alelio | July 27, 1943 |
| 2,364,900 | Hessel et al. | Dec. 12, 1944 |
| 2,395,825 | Hesler | Mar. 5, 1946 |
| 2,404,367 | Durant et al. | July 23, 1946 |
| 2,442,989 | Sussman | June 8, 1948 |
| 2,515,116 | Dudley | July 11, 1950 |
| 2,522,668 | Dudley | Sept. 19, 1950 |
| 2,596,930 | Kaiser | May 13, 1952 |

OTHER REFERENCES

Chemical Eng. Progress, vol. 44, No. 4, Trans. Amer. Inst. Chem. Engineers, pp. 269–274, 1948.